(No Model.) 2 Sheets—Sheet 1.
E. THOMSON.
ELECTRIC MEASURING INSTRUMENT.

No. 560,379. Patented May 19, 1896.

WITNESSES
Henry Westendarp.
B. B. Hull.

INVENTOR
Elihu Thomson, by
Geo. B. Blodgett,
Atty.

(No Model.) 2 Sheets—Sheet 2.

E. THOMSON.
ELECTRIC MEASURING INSTRUMENT.

No. 560,379. Patented May 19, 1896.

WITNESSES
Henry O. Westendarp.
B. B. Hull

INVENTOR
Elihu Thomson, by
Geo. R. Blodgett,
Atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

ELECTRIC MEASURING INSTRUMENT.

SPECIFICATION forming part of Letters Patent No. 560,379, dated May 19, 1896.

Application filed March 29, 1895. Serial No. 543,746. (No model.)

*To all whom it may concern:*

Be it known that I, ELIHU THOMSON, a citizen of the United States, residing at Swampscott, in the county of Essex, State of Massachusetts, have invented certain new and useful Improvements in Electric Measuring Instruments, of which the following is a specification.

My invention relates to improvements in electric measuring instruments which are adapted either for use upon alternating or upon continuous current circuits, and which may be made to give indications of potential, as voltmeters, or of current, as ammeters. They are, however, particularly designed for use upon alternating circuits where the presence of iron in the instruments might be objectionable. The instrument is adaptable also to be used as a wattmeter by having a portion of its coils traversed by a current in series with the work and other portions of its coils traversed by currents in shunt to the work, as is common in such instruments.

The accompanying drawings show embodiments of my invention.

Figure 1:
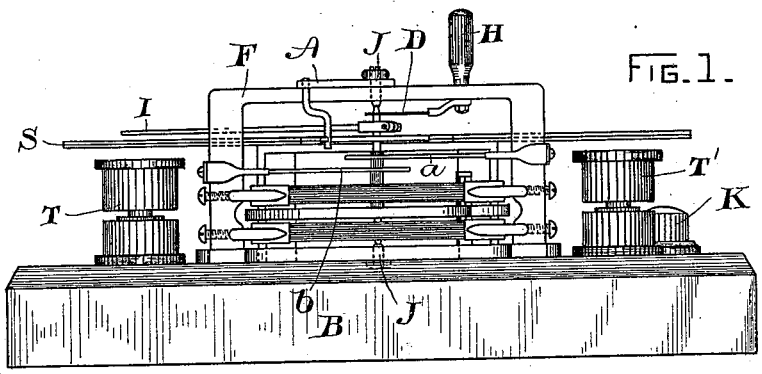
Figure 2:
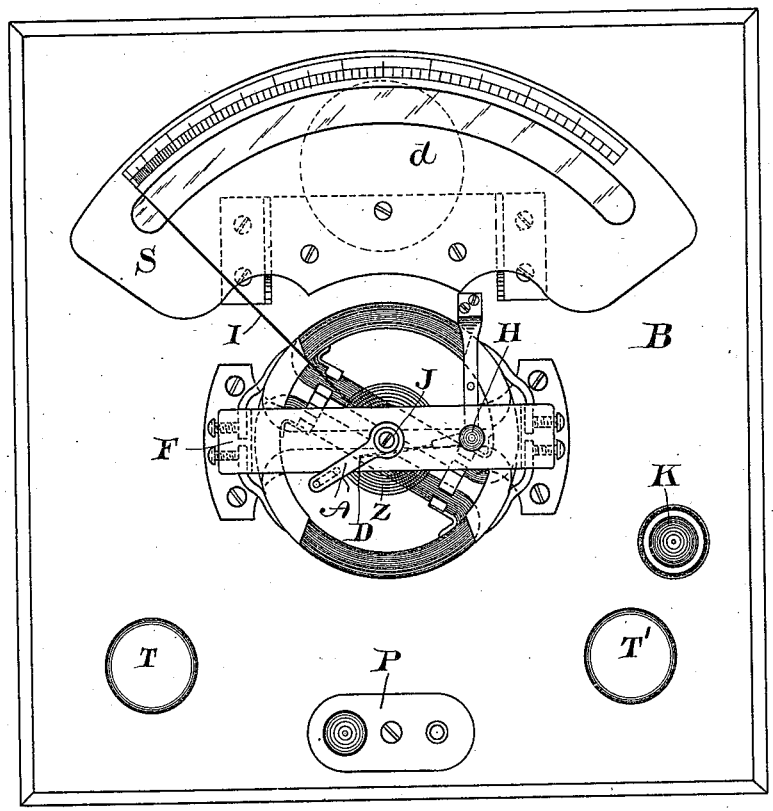
Figure 3:
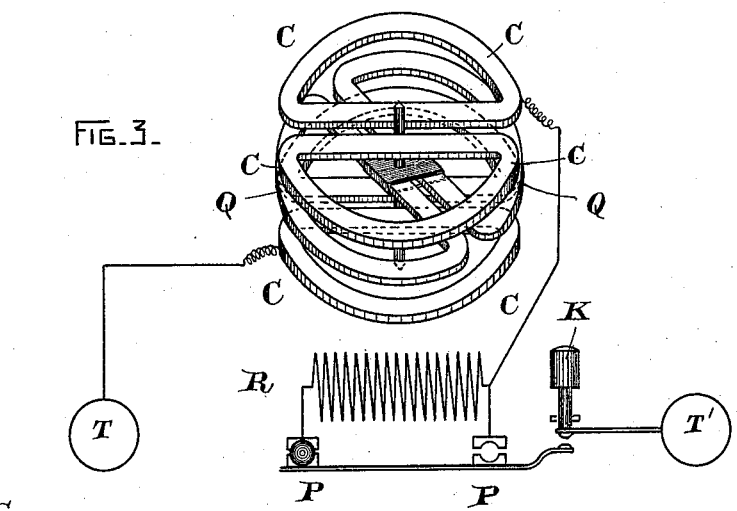
Figure 4:
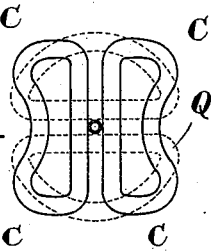
Figure 5:
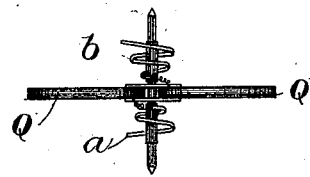
Figure 6:
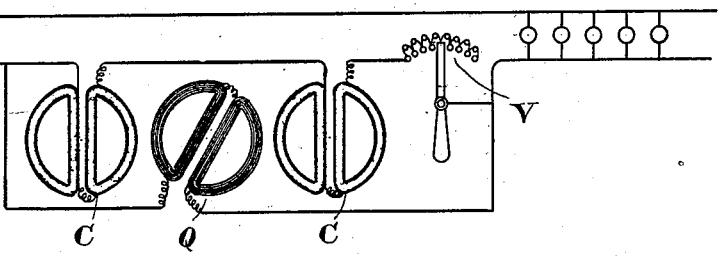
Figure 7:
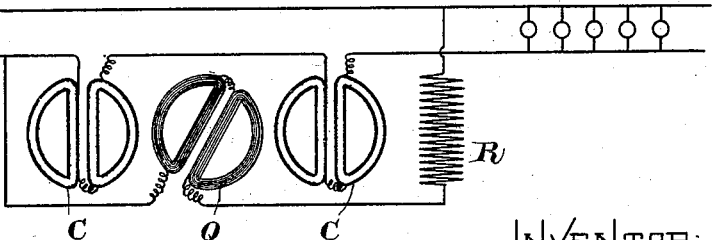

Figure 1 is an end elevation of the instrument. Fig. 2 is a plan view. Fig. 3 shows the arrangement of the circuits and coils which form the elements of the instrument when used as a voltmeter. Fig. 4 shows a modification of structure. Fig. 5 is a separate view of the modified system of coils, the coils being shown on edge. Fig. 6 is an arrangement of circuits adapting the instrument for use as an ammeter, and Fig. 7 is an arrangement of circuits adapting the instrument for use as a wattmeter.

This application describes devices which somewhat resemble and are improvements upon those claimed in my Patents Nos. 537,499 and 537,500.

In Figs. 1 and 2 a base B B, of insulating material preferably, carries upon it a metal frame F F, open in the center and having supports at J J containing jewels for the reception of the axle, carrying the movable parts of the instrument. The index I is carried on the shaft in any way, and in Fig. 2 is shown as resting on the zero of the scale S. Below the index is a spiral spring, like the hair-spring of a watch. To an arm A, centrally pivoted on the frame F, the outer end of the spring is attached, while its inner end is secured to the shaft which carries the moving parts. Upon the shaft are also carried two connections, as at $a\ b$, made of fine silver-foil wrapped around the shaft several times, so that the shaft may turn freely, which are used for introducing current to the movable part of the apparatus, also mounted upon the shaft. These various features will be referred to in other figures.

A button or handle H, pivoted in the frame F, carries a little arm with a bristle or strip of flexible material D, which can be turned into contact with the upper end of the shaft for stopping too-violent oscillations of the needle or index. A circuit-closing button or switch K is mounted on the base. Its connections are shown in Fig. 3. There is also a plug-switch P, Fig. 2, for plugging in or plugging out of circuit a resistance-coil, which is mounted on the instrument at any convenient point, as in the circular dotted lines $d$, immediately below the scale. The terminals are at T T' a set of ordinary binding-posts.

Referring now to Fig. 3, the connections of the instrument, and other parts of its structure not easily seen in Figs. 1 and 2, are shown. T T' are the terminals, as before. The switch K may be depressed, so as to close a circuit through the instrument, while the plug-switch P P may be made to insert the resistance R or to cut it out, as when the plug is at the left the resistance R will be in circuit, and if it is at the right the resistance R will be cut out. A fixed set of coils and a movable set are used. The fixed set may be made up of two or more sets of coils C C, preferably an upper and a lower set, which are securely held by proper supports in the frame F, Figs. 1 and 2. These coils are shown as semicircular in outline, and are flat semicircles mounted in coincident planes, the two coils of the upper set forming a circular coil with a double diameter, and the two coils of the lower set also forming a circular coil with the windings parallel with those of the upper coil. These four semicircular coils carry a current, but the current is reversed in direction in one of the coils of the upper set relatively to the other coil, and in one of the lower set relatively to the other of the lower set. It is, however, maintained parallel and in the same direction in the corresponding coils of the upper and lower sets, so that the magneto-motive force of the upper and lower parallel coils will be in the same direction, but reversed in the two halves of the system. These fixed coils are closely approximated, with just enough space for the placing and free movement of another movable set Q of coils, similar in structure and relation. The direction of current in the coils Q Q is also reversed, such coils being put into circuit by the little silver-foil strips surrounding the shaft and indicated at *a b*, Fig. 1. The two movable coils are connected in series, giving thus two free terminals, while the current therein is reversed in its direction of flow in one relatively to the other. The position of the coils, relatively, when the needle or index I, Figs. 1 and 2, is at zero, is preferably about that shown in Fig. 3, and the connection of the coils of the movable set and the fixed set is so made that the current traversing them tends to throw the movable set around from the position indicated in right-handed rotation, and into parallelism with the fixed set. This will cause the index to move through a large angle, as the magnetizing effects of the coils are at the start nearly opposed, while at the end of the scale they are nearly in harmony. The torque so obtained registers the strength of current flowing, and is of course opposed by the spring Z when the instrument is constructed with a spring, while it may be slightly opposed by gravity if the instrument is set up with its coils in a vertical plane. This latter effect is obtained by loading the movable system a little, so as to have the center of gravity a little below the center or axis of the moving coils. The winding of the movable coil may be connected in series with the other coils, or in parallel. For voltmeter purposes the series arrangement is to be preferred. The relative section of its wire may be made smaller than that of the fixed coils. Its turns need not be so many as in the fixed coils, and the material of its winding may, if desired, be of aluminium to secure lightness, since the matter of higher specific resistance is of no consequence.

A connection to a source of electric potential, with a plug-switch P arranged to cut out the resistance R, would render the instrument sensitive to the lower potentials; but for greater accuracy and for adapting the instrument to read moderately high potentials, such as one hundred volts or more, a large resistance R, preferably non-inductive, is employed and the plug-switch is arranged to cut in the resistance in series with the coil system. With the system of coils as indicated in Fig. 3 the tendency of the scale is to be rather open in the middle of its range or near thereto, which is an advantage obtained in voltmeter measurements as ordinarily constructed for measuring potentials on electric-lighting circuits, &c., it being desirable to have the greatest sensitiveness at or near the ordinary voltage or average potential, so that slight departures therefrom may be readily noted. The especial advantage of the arrangement of coils and circuits of the moving and fixed sets is that the instrument is entirely astatic and not influenced by stray fields into which it may be brought. This is due to the fact that the system is virtually a double magnetic circuit or a magnetic circuit closed on itself, with magneto-motive forces exerted in two opposite directions, so that a stray magnetic field would affect one field of the instrument to diminish it, but at the same time would proportionally increase the other portion of the magnetic circuit.

While the fixed coils have been shown as nearly semicircular, their shape may be modified to secure particular effects, as when it may be desirable to secure a scale in which the divisions are more uniform, indicating certain units of increment of current or potential. Thus in Fig. 4 the fixed coils are shown in solid lines, while the semicircular movable coils are shown in dotted lines, the fixed coils C C C C being of the shape shown—that is, the central portion is narrowed. The effect of this is to reduce the rate of change and also the leverage of the deflecting forces upon the movable-coil system when the coils are at or near the positions shown in Fig. 4, as when the index I is near the middle of the scale. By taking advantage of this deformation or differing configurations of coils the instrument may be adapted to read as desired and its divisions made, relatively to one another, more or less uniform.

In Fig. 5 I show a view of the shaft and the two coils Q Q, the coils being seen on edge, while the very fine flexible silver-foil connections are indicated at *a b*, curled around and free from the shaft. The terminals *a b* are carried to the fixed connections of the circuit, as usual.

In Fig. 6 I show, diagrammatically, the arrangement of the movable and fixed coils which it is desirable to adopt in making the instrument for use as an ammeter for alternating currents. In this case the movable coils are in series with each other, but in shunt to the other coils or to the fixed system C C, and I also provide a variable resistance V, non-inductive in character, for changing the resistance in circuit with the fixed coils C C, thereby adjusting the magnetic relations of both fixed and movable coils. In this arrangement, as it is to be used as an ammeter for measuring current flow, it is desirable to keep the section of the coils C C as large as possible, and hence they are made of much larger wire than the movable coils—that is, a larger fraction of current is caused to flow through the fixed system than through the movable system, in order to avoid the necessity for carrying much current through the flexible connections to the movable system. Adjustments adapting the instrument to work with varying frequency may be made at V, so as to keep the self-induction of the two sets of coils nearly the same.

In using the instrument as an ammeter it still preserves its astatic character, owing to the disposition of the coil being the same as before so far as the relations of current and magneto-motive force as affected by stray field are concerned. This is true also when the instrument is used as a wattmeter, in which case the circuit arrangements are those of Fig. 7. Here the fixed coils are in series with the work, while the movable-coil system Q is in derived circuit with a high resistance R, non-inductive in character, connected in the derived circuit. This is the well-known wattmeter arrangement so far as the mere matter of connecting the coils is concerned, and in such a wattmeter in most instances the size of wire in the coils C C will be selected to carry the load-current, while the wire in the coils Q will be relatively fine. So, also, the actual space occupied by the coils C C and the weight of metal in them may be made much greater than that of the movable coils, it being desirable to keep down the weight of the movable element to avoid the effect of momentum.

What I claim as new, and desire to secure by Letters Patent of the United States, is—

1. In an electric measuring instrument, sets of fixed coils, each set composed of a plurality of coils so arranged that the current traverses the respective coils of each set in relatively opposite directions, and passes through similar coils in the several sets in the same direction; in combination with a movable set of coils also composed of a plurality of coils so wound that the current passes in opposite directions in the respective coils, and circuit connections for the different sets of coils.

2. In an electric measuring instrument, the combination of two sets of fixed coils, each set composed of two flat semicircular coils, each coil having a diametral portion, and the coils in each set being so wound that the current passes in opposite directions in the respective coils of each set, but in the same direction in the coils having the same relative position in the different sets; in combination with a movable member composed of two flat semicircular coils having adjacent diametral portions, and so wound that the current traverses the respective coils in opposite directions, and circuit connections for the several sets of coils.

3. In an electric measuring instrument, the combination of two sets of fixed coils, each set composed of two flat semicircular coils, each coil having a diametral portion, and the coils in each set being so wound that the current passes in opposite directions in the respective coils of each set, but in the same direction in the coils having the same relative position in the different sets; in combination with a movable member composed of two flat semicircular coils having adjacent diametral portions, and so wound that the current traverses the respective coils in opposite directions, an indicator for the movable set of coils, and circuit connections for the several sets of coils.

4. An electric measuring instrument made without iron, comprising sets of fixed coils in which the current passes in respectively opposite directions in the several coils, passing in the same direction in similarly-placed coils of each set, and a movable element composed of two similar coils in which the current passes in respectively opposite directions, an indicator attached to the movable coils, circuit connections for the coils, a resistance in the circuit, and means for cutting in and cutting out the resistance.

5. In an electric measuring instrument, the combination of two sets of fixed coils, each set composed of two flat semicircular coils, each coil having a diametral portion, and the coils in each set being so wound that the current passes in opposite directions in the respective coils of each set, but in the same direction in the coils having the same relative position in the different sets; in combination with a movable member composed of two flat semicircular coils having adjacent diametral portions, and so wound that the current traverses the respective coils in opposite directions, a spring opposing the motion of the movable coils and circuit connections for the several sets of coils.

6. In an electric measuring instrument, the combination of fixed members composed of coils and a movable member also composed of coils, the coils being so disposed and wound as to balance the movable member astatically in the magnetic field.

In witness whereof I have hereunto set my hand this 26th day of March, 1895.

ELIHU THOMSON.

Witnesses:
JOHN W. GIBBONEY,
HENRY WESTENDARP.